(12) United States Patent
Woehlke et al.

(10) Patent No.: US 12,436,509 B2
(45) Date of Patent: Oct. 7, 2025

(54) DEVICE AND METHOD FOR CONTROLLING AN AGENT

(71) Applicant: Robert Bosch GmbH, Stuttgart (DE)

(72) Inventors: Jan Guenter Woehlke, Leonberg (DE); Felix Schmitt, Ludwigsburg (DE); Herke van Hoof, Diemen (NL)

(73) Assignee: ROBERT BOSCH GMBH, Stuttgart (DE)

( * ) Notice: Subject to any disclaimer, the term of this patent is extended or adjusted under 35 U.S.C. 154(b) by 510 days.

(21) Appl. No.: 17/898,846

(22) Filed: Aug. 30, 2022

(65) Prior Publication Data

US 2023/0090127 A1   Mar. 23, 2023

(30) Foreign Application Priority Data

Sep. 22, 2021   (DE) .................. 10 2021 210 533.5

(51) Int. Cl.
   *G05B 13/02*   (2006.01)
(52) U.S. Cl.
   CPC .................. *G05B 13/027* (2013.01)
(58) Field of Classification Search
   CPC .................................................... G05B 13/027
   See application file for complete search history.

(56) References Cited

U.S. PATENT DOCUMENTS

| | | | | |
|---|---|---|---|---|
| 2019/0232488 A1* | 8/2019 | Levine | ............... | B25J 9/161 |
| 2020/0061811 A1* | 2/2020 | Iqbal | ............... | G06N 3/08 |
| 2021/0162589 A1* | 6/2021 | Tan | ............... | B62D 57/032 |
| 2021/0390409 A1* | 12/2021 | Geist | ............... | G06N 3/08 |
| 2022/0076099 A1* | 3/2022 | Sermanet | ............... | G06N 3/08 |
| 2022/0414419 A1* | 12/2022 | Laszlo | ............... | G06N 3/006 |
| 2023/0330846 A1* | 10/2023 | Zhou | ............... | G06N 3/084 |

OTHER PUBLICATIONS

Chen, et al.: "Learning to Plan in High Dimensions via Neural Exploration—Exploitation Trees," ICLR 2020 Conference Paper, arXiv: 1903.00070, pp. 1-26.

Huang, Yanhua: Chapter 4 Deep Q-Networks, Deep Reinforcement Learning, Fundamentals, Research & Applications, Springer, Singapore, (2020), pp. 135-160.

(Continued)

*Primary Examiner* — Christopher E. Everett
(74) *Attorney, Agent, or Firm* — NORTON ROSE FULBRIGHT US LLP (57) ABSTRACT

A method for controlling an agent. The method includes obtaining numerical values of a first and second set of state variables, which together represent a current full state of the agent, and the numerical values of the first set of state variables represent a current partial state of the robot; determining a state value prior comprising, for potential subsequent partial states following the current partial state, an evaluation of the subsequent partial states in terms of achieving a goal to be attained by the agent; supplying an input comprising a local crop of the state value prior and the numerical values of the second set of state variables representing, together with the numerical values of the first set of state variables, the current full state to a neural network configured to output an evaluation of control actions and controlling the agent in accordance with control signals.

13 Claims, 3 Drawing Sheets

(56) References Cited

OTHER PUBLICATIONS

Reinforcement learning, Wikipedia, (2021), UTC. URL:https://en.wikipedia.org/w/index.php?title=Reinforcement_learning&oldid=1044659619 [accessed on Jan. 9, 2023], pp. 1-16.

Wöhlke, et al.: "Hierarchies of Planning and Reinforcement Learning for Robot Navigation," 2021 IEEE International Conference on Robotics and Automation (ICRA 2021), China, pp. 10682-10688.

* cited by examiner

DEVICE AND METHOD FOR CONTROLLING AN AGENT

CROSS REFERENCE

The present application claims the benefit under 35 U.S.C. § 119 of German Patent Application No. DE 10 2021 210 533.5 filed on Sep. 22, 2021, which is expressly incorporated herein by reference in its entirety.

FIELD

The present disclosure relates to devices and methods for controlling an agent such as a robot.

BACKGROUND INFORMATION

Reinforcement Learning (RL) is a machine learning paradigm that allows an agent such as a machine to learn to perform desired behaviours with respect to a task specification, e.g., which control actions to take to reach a goal location in a robotic navigation scenario. Learning a policy that generates these behaviours with reinforcement learning differs from learning it with supervised learning in the way the training data is composed and obtained: While in supervised learning the provided training data consists of matched pairs of inputs to the policy (e.g. observations like sensory readings) and desired outputs (actions to be taken), there is no fixed training data provided in case of reinforcement learning. The policy is learned from experience data gathered by interaction of the machine with its environment whereby a feedback (reward) signal is provided to the machine that scores/asses the actions taken in a certain context (state).

The RL task is challenging in case the provided reward signal is very sparse: For example, a binary reward that indicates task completion is only provided at the end of the interaction episodes. As a result, the training to meet a certain quality criterion with the policy may take very long, requiring many interaction steps in the (simulation) environment and/or policy updates, or fail.

Assuming some prior knowledge about the (simulated) environment (e.g., the availability of a map in case of a robot or vehicle navigation task), the combination of a planning algorithm that guides the reinforcement learning may be used in order to improve data-efficiency.

According to a Value Iteration (VI)-RL approach, a hierarchical combination of planning and reinforcement learning is introduced: value iteration (planning) with a learned transition model is employed in a "high-level" state space abstraction of the continuous robot state space, in order to generate sub-goals for some "low-level" reinforcement learning policy operating in the original continuous robot state space.

The high-level state space abstraction needs to be designed by the algorithm designer prior to training and deployment of the hierarchical control method. First, a number of $n_s$ salient state space dimensions needs to be selected from the continuous robot state. In case of a non-holonomic vehicle, a possible selection might be the x- and y-position as well as the orientation of the vehicle. Afterwards, the selected state space dimensions need to be discretized appropriately in order to obtain the finite high-level state space abstraction.

While VI-RL approaches may provide good results, improved approaches for learning control policies for robot devices (or in general agents) and controlling robot devices (agents) in terms of data efficiency, flexibility and control accuracy are nevertheless desirable.

SUMMARY

According to various embodiments of the present invention, a method for controlling an agent is provided including obtaining numerical values of a first set of state variables and a second set of state variables, wherein the numerical values of the first set of state variables together with the numerical values of the second set of variables represent a current full state of the agent and the numerical values of the first set of state variables represent a current partial state of the robot, determining a state value prior including, for potential subsequent partial states following the current partial state, an evaluation of the subsequent partial states in terms of achieving a goal to be attained by the agent, supplying an input including a local crop of the state value prior and the numerical values of the second set of state variables representing, together with the numerical values of the first set of state variables, the current full state to a neural network configured to output an evaluation of control actions (e.g. in the form of state-action values) and controlling the agent in accordance with control signals derived from an evaluation of control actions output by the neural network in response to the input.

Further, a controller according to the above controlling method is provided.

According to various embodiments of the present invention, the neural network is also denoted as a Value Refinement Network (VRN). It may in particular be used in a hierarchical approach wherein the control actions are high-level actions (or sub-goals).

In comparison to the VI-RL approach, the VRN-based approach according to the controlling method described above is much more flexible in utilizing a given (e.g. high-level) state space abstraction or a given state value prior therein and it can adjust to recent state information and sensor measurements:

Further, in contrast to the VI-RL approach, the VRN-based approach relaxes the quality requirements on the (e.g. high-level) state space abstraction. Whereas the VI-RL approach needs a high-level state space abstraction that captures all important properties of the controlled robot, e.g. position and orientation in case of non-holonomic vehicle parking, the VRN-based approach can learn how to refine an incomplete or sub-optimal high-level state space or value (tensor) prior to choose good actions (or sub-goals).

This allows for much better scaling and broader applicability of the VRN-based approach. As the memory and run-time requirements of exact planning approaches follows the product of the discretization steps in the dimensions of the high-level state space, using and also designing a precise (i.e. high-dimensional and/or fine-grained) high-level state space is infeasible for many real world robotic tasks.

Furthermore, the Value Refinement Network also allows including recently obtained, exact (continuous) robot state (observation) values (e.g. exact velocity, orientation, joint configuration, etc. values) and additional local sensor measurements to decide on the actions/sub-goals towards the goal.

The VI-RL approach only takes into account the static environment and the potential (discretized, high-level) robot states that are known or computable beforehand, when deciding on a plan or high-level actions to the goal.

The VRN-based approach, instead, is able to also process measurements such as sensor scans of other moving objects or changes of the environment to adjust the plan locally and apply adapted actions accordingly. This can result in a significantly higher task completion (goal-reaching) rate.

In the following, various example embodiments are given.

Embodiment 1 is a method for controlling an agent as described above.

Embodiment 2 is the method of embodiment 1, wherein controlling the agent includes determining a sub-goal from the evaluation of the control actions, determining control signals for attaining the sub-goal and controlling the agent in accordance with the control signals.

In particular, the evaluation of the control actions may be used as a planner or for selecting discrete actions.

Embodiment 3 is the method of embodiment 2, wherein the sub-goal specifies a target partial state.

Thus, an efficient hierarchical control scheme may be provided in which a low-level controller controls the agent for attaining the target partial states.

Embodiment 4 is the method of embodiment 3, including determining the sub-goal by a planning policy operating on partial states represented by the first set of state variables and including determining the control signals for attaining the sub-goal by means of a control policy operating on full states represented by the first set and the second set of state variables.

To achieve reliable control, the low-level controller may take into account the full state information (i.e. the values of the state variables of both the first set and the second set of state variables) which may in particular include values of continuous state variables (e.g. obtained from sensor data). For example, the state variables of the first set of state variables are discretized to discrete values for the prior generation while continuous values of the state variables of both the first set and the second set of state variables are used (or at least a part of them is used, possibly only of the second set of state variables) by the neural network and the low-level controller.

Embodiment 5 is the method of embodiment 4, further including training the control policy by reinforcement learning.

Reinforcement learning provides an efficient way for training the low-level controller.

Embodiment 6 is the method of any one of embodiments 1 to 5, further including determining prior environment information, wherein the input further includes the prior environment information.

Prior information like e.g. a section of a map enhances the performance of the neural network and thus allows more efficient control of the agent.

Embodiment 7 is the method of any one of embodiments 1 to 6, wherein the input further includes the values of at least some of the first set of state variables.

Considering the full state information increases the accuracy of the evaluation by the neural network.

Embodiment 8 is the method of any one of embodiments 1 to 7, wherein the neural network is a convolutional neural network and the method includes inputting the local crop of the state value prior as an input feature map and the numerical value of each state variable of the second set of state variables as a respective additional input feature map for each state variable of the second set of state variables to the neural network.

The numerical values of the first set of state variables may also input to the neural network by further input feature maps (similarly as the numerical values of the second set of state variables).

Convolutional networks are an efficient class of neural networks for processing input manner represented in this manner. The neural network can thus be efficiently trained to determine the control action evaluations.

Embodiment 9 is the method of any one of embodiments 1 to 8, further including training the neural network to output evaluations of control actions in response to a local crop of a state value prior input and a state variable input.

Embodiment 10 is the method of embodiment 9, including training the neural network using a double deep Q network (double DQN) algorithm.

Double deep Q networks allow efficient training of evaluations of control actions.

Embodiment 11 is a controller, configured to perform a method of any one of embodiments 1 to 10.

Embodiment 12 is a computer program including instructions which, when executed by a computer, makes the computer perform a method according to any one of embodiments 1 to 10.

Embodiment 13 is a computer-readable medium including instructions which, when executed by a computer, makes the computer perform a method according to any one of embodiments 1 to 10.

In the figures, similar reference characters generally refer to the same parts throughout the different views. The figures are not necessarily to scale, emphasis instead generally being placed upon illustrating the principles of the present invention. In the following description, various aspects of the present invention are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
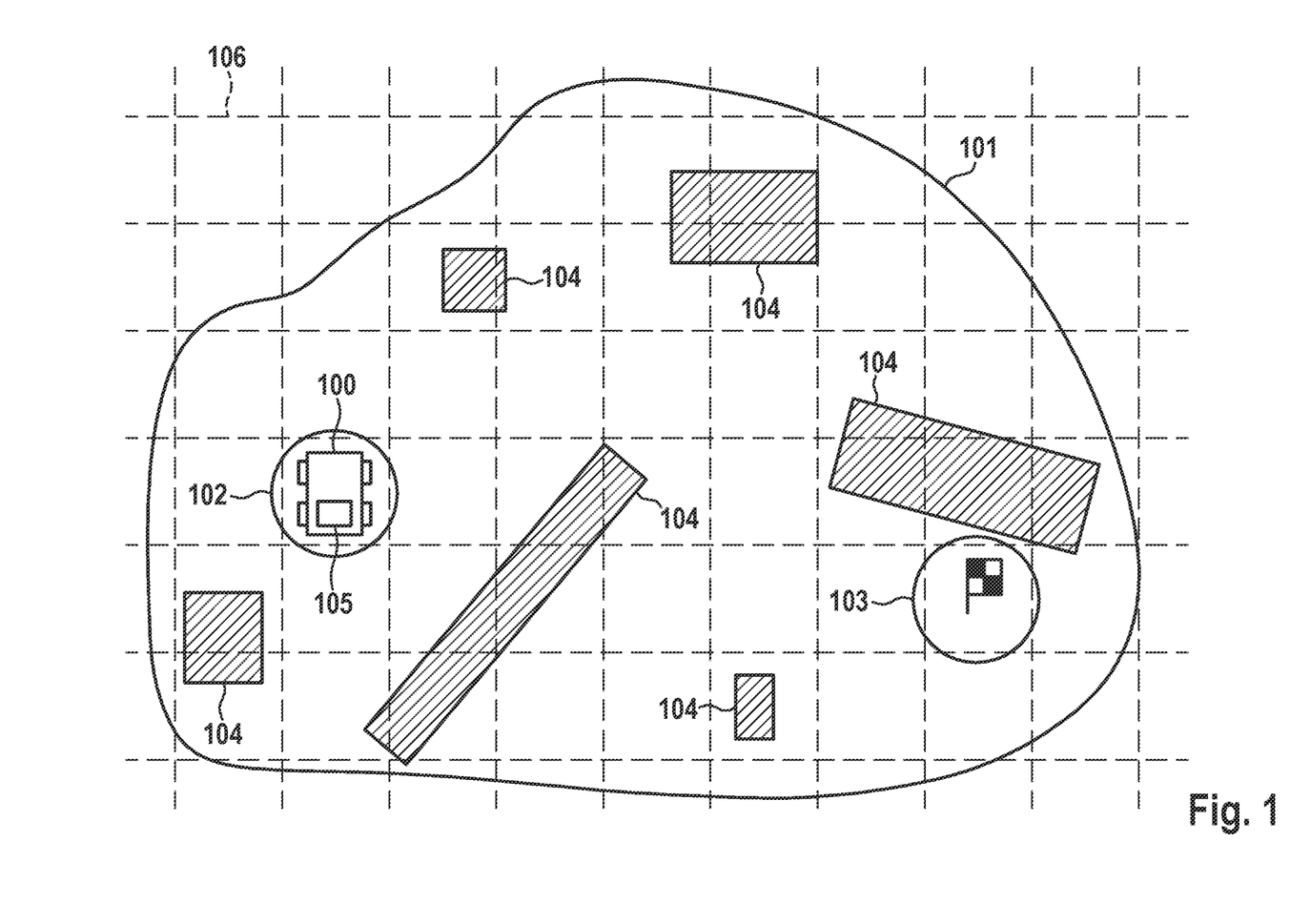
FIG. 1 shows a control scenario according to an example embodiment of the present invention.

FIG. 1 shows a control scenario.

A robot 100 is located in an environment 101. The robot 100 has a start position 102 and should reach a goal position 103. The environment 101 contains obstacles 104 which should be avoided by the robot 100. For example, they may not be passed by the robot 100 (e.g. they are walls, trees or rocks) or should be avoided because the robot would damage or hurt them (e.g. pedestrians).

The robot 100 has a controller 105 (which may also be remote to the robot 100, i.e. the robot 100 may be controlled by remote control). In the exemplary scenario of FIG. 1, the goal is that the controller 105 controls the robot 100 to navigate the environment 101 from the start position 102 to the goal position 103. For example, the robot 100 is an autonomous vehicle but it may also be a robot with legs or tracks or other kind of propulsion system (such as a deep sea or mars rover).

Furthermore, embodiments are not limited to the scenario that a robot should be moved (as a whole) between positions 102, 103 but may also be used for the control of a robotic arm whose end-effector should be moved between positions 102, 103 (without hitting obstacles 104) etc.

Accordingly, in the following, terms like robot, vehicle, machine, etc. are used as examples for the "object", i.e. computer-controlled system (e.g. machine), to be controlled. The approaches described herein can be used with different types of computer-controlled machines like robots or vehicles and other. The general term "robot device" is also used in the following to refer to all kinds of physical system which may be controlled by the approaches described in the following. However, the approaches described in the following may be applied to any kind of agent (e.g. also an agent which is only simulated and does not physically exist).

Ideally, the controller 105 has learned a control policy that allows it to control the robot 101 successfully (from start position 102 to goal position 103 without hitting obstacles 104) for arbitrary scenarios (i.e. environments, start and goal positions) in particular scenarios that the controller 105 has not encountered before.

Various embodiments thus relate to learning a control policy for a specified (distribution of) task(s) by interacting with the environment 101. In training, the scenario (in particular environment 101) may be simulated but it will typically be real in deployment.

Reinforcement Learning (RL) is a technique for learning a control policy. An RL algorithm iteratively updates the parameters θ of a parametric policy $\pi_\theta$ (a|s), for example represented by a neural network, that maps states s (e.g. (pre-processed) sensor signals) to actions a (control signals). During training, the policy interacts in rollouts episodically with the (possibly simulated) environment 101. During a (simulated training) rollout in the environment 101, the controller 105, according to a current control policy, executes, in every discrete time step an action a according to the current state s, which leads to a new state s' in the next discrete time step. Furthermore, a reward r is received, which it uses to update the policy. A (training) rollout ends once a goal state is reached, the accumulated (potentially discounted) rewards surpass a threshold, or the maximum number of time steps, the time horizon T, is reached. During training a reward-dependent objective function (e.g. the discounted sum of rewards received during a rollout) is maximized by updating the parameters of the policy. The training ends once the policy meets a certain quality criterion with respect to the objective function, a maximum number of policy updates have been performed, or a maximum number of steps have been taken in the (simulation) environment.

As mentioned above, a VI-RL approach may be used for control. An execution of this control method works the following way: At the beginning of the rollout, the high-level value iteration planner receives prior knowledge on the state space abstraction level of the environment (e.g. a map indicating walls and obstacles in case of a vehicle) as well as the goal configuration/state of the robot as input. The value iteration is executed using its (learned) high-level transition model to determine a Q-value tensor for the high-level state space abstraction that has an entry for any high-level state z and high-level action/sub-goal $z_g$ i.e. high-level neighbouring states: $Q(z,z_g)$, which is $n_s+1$ dimensional. Based on this value tensor, repeatedly sub-goals for the low-level RL controller are selected. During deployment, the sub-goal $z_g$ with the highest value for the current high-level robot state z is selected. From the selected high-level sub-goal a target vector for the low-level policy is generated taking into account the current low-level state s of the robot and the low-level states associated with the selected sub-goal. The low-level policy receives this target vector alongside the (low-level) robot state (obtained from sensor measurements) as input and calculates the continuous actions applied to the actuators of the robot. During training, the collected low-level and high-level transition data of the rollouts is used to update the parameters of the transition model of the high-level value iteration planner as well as the parameters of the low-level (RL trained) neural network policy.

According to various embodiments, similar to the VI-RL approach, plans in a state space abstraction, in the form of value tensors, are combined with low-level control, which might be trained via reinforcement learning. Compared to the VI-RL approach described above, the present approach provides a more flexible approach for planning in the state space abstraction with respect to including additional (sensor, robot state, prior) information and better scaling with respect to the robot state dimensionality: the present approach, which is based on a Value Refinement Network (VRN) (and therefore also referred to as VRN-based approach in the following), locally refines a prior, incomplete or sub-optimal plan in form of a value tensor, in the (high-level) state space abstraction. Therefore, it requires either a prior value tensor or a high-level representation of the robot state space that allows value-based planning. The prior value (tensor) can represent an incomplete plan e.g. from planning a similar task or a plan that only considers parts of the full robot state space.

If no prior value is given but a finite high-level state space abstraction e.g. covering the most essential state space dimensions (x-, y-, (z-) position of the robot) is provided, a state value prior may be obtained by e.g. some shortest path planning (A*, . . . ), value iteration, or a differentiable planning module (VIN, MVPROP, . . . ), as input to the VRN. If this state value prior generation includes a trainable parametric model (e.g. neural network), it can be trained jointly or end-to-end (depending on the approach) with the VRN.

The input to the Value Refinement Network (VRN) is generated using a crop of this state value prior (i.e. a local state value prior) corresponding to the current robot state and the full robot state (observation) potentially including local sensor measurements. Optionally, a local crop of prior information about the environment/workspace (like e.g. an obstacle map) is also part of the input. See FIG. 2 (described in detail further below) for an exemplary realization of an effective input representation. During the learning phase, the Value Refinement Network is trained (e.g. via a double deep Q network (double DQN), optionally with hindsight experience replay (HER)) to refine the state value prior to a locally approximately optimal value function and a corresponding approximately optimal policy. In this way the approach allows, in contrast to the VI-RL approach, to incorporate the full (continuous) robot state and local sensor measurements into the action/sub-goal selection.

The Value Refinement Network is trained to output refined Q-values (z,*) for the abstract (high-level) state z corresponding to the current (continuous) robot state. Similarly as in the VI-RL approach approach, these Q-values can be used for selecting high-level sub-goals $z_g$ in a hierarchical controller architecture with a potentially reinforcement learning trained low-level controller. Alternatively, the refined values can also be used for selecting discrete control actions a (e.g. in a discrete state and action space setting, where no continuous low-level control is needed). This means that the VRN does not necessarily have to be used in a hierarchical approach (for a planner) but may also be directly used for a control policy.

According to various embodiments, a hierarchical VRN-based approach (and thus a hierarchical planning-guided reinforcement learning control policy) is used. This means that the controller 105 uses a high-level (coarse-scale) planning (i.e. planning policy) on a coarse, discrete (map) representation of the environment 101 to set (relative) sub-goals (target vectors) for a (fine-scale) control policy that acts in the continuous state and action space of the environment 101. The coarse, discrete representation of the environment is for example a grid 106 (shown as dashed lines in FIG. 1) wherein each tile of the grid 106 is a state in the coarse representation of the environment. High-level is also referred to as coarse-scale. Low-level learning operates on a practically "continuous" (e.g. up to calculation or number representation accuracy) scale, i.e. a much finer representation. Low-level is also referred to as fine-scale. For example, for an autonomous driving scenario, the tiles of the grid 106 are 10 meters×10 meters while the low-scale has an accuracy of centimetres, millimetres or even below.

In the following, an embodiment of the hierarchical VRN-based approach is described.

Task

Consider a distribution of Markov Decision Processes (MDPs) $\mathcal{M}$ that share the same state space $\mathcal{S} \subseteq \mathbb{R}^n$ and action space $\mathcal{A} \subseteq \mathbb{R}^u$. Specific MDPs $m=(\mathcal{S}, \mathcal{A}, \mathcal{P}_m, r, \gamma, T)$ can be sampled. Start state $s_{0,m}$ and goal state $g_m$ are sampled from the MDP specific start distribution $\mathcal{S}_{0,m} \subseteq \mathcal{S}$ and goal distribution $\mathcal{S}_{g,m} \subseteq \mathcal{S}$, respectively. The (goal-dependent) reward function is of the following form: $r(s,g_m) = \mathbb{1}_{d(s,g_m) \le \epsilon} + c$ with $d(.,.)$ being some distance measure and c some constant to potentially offset the reward signal. $\mathcal{P}_m$ are the MDP specific transition dynamics that model the transition from a state s to the next state s' given as a result of action a. γ is the discount factor and T the time horizon (maximum amount of steps to reach the goal state from the start state).

Objective

It is the objective to maximize the expected returns under the distribution of MDPs, the goal and initial state distributions, and the dynamics:

$$\max \mathbb{E}_{m \sim \mathcal{M}, s_{0,m} \sim \mathcal{S}_{0,m}, g_m \sim \mathcal{S}_{g,m}, \mathcal{P}_m} \left[ \sum_{t=0}^{T} \gamma^t r(s_t, g_m) \right]$$

Robot State and State Space Abstraction for Planning

The state s of the robot contains information of the state of the robot itself, like its position, velocity, orientation, etc. in the environment or its joint configuration and velocity, each obtained by appropriate sensors, as well as potential information about its (local) surroundings extracted from local sensor measurements (e.g. to determine the local obstacle layout or track other robots' position).

For the planning in the abstract (high-level) representation, only a subset $\bar{s}$ of the state components is considered, with $$s = \begin{pmatrix} \bar{s} \\ \underline{s} \end{pmatrix}.$$

This "planning state" $\bar{s}$ is appropriately discretized in order to obtain the abstract (high-level) states z belonging to the finite, abstract (high-level) state space $\mathcal{Z}$. This can be represented by a surjective mapping $z = f_{\mathcal{Z}}(s) = f_{\mathcal{Z}}(\bar{s})$ transforming robot states s into abstract (high-level) states z. The finite state space $\mathcal{Z}$ allows for value iteration style planning.

State Value Prior

A state value prior V(z) is assumed to be either being given or obtained by a standard approach like for example value iteration (potentially with a learned transition model like in the VI-RL approach), a differentiable planning module like e.g. value propagation (e.g. MVPROP), or any other planning approach that generates a value tensor for $\mathcal{Z}$. To obtain the state value prior, the planning approach receives e.g. a prior, static environment/workspace map Φ, e.g. indicating obstacles, and the goal state $g_m$ as input. The planning component to obtain V(z) may include a neural network with parameters χ that can be trained jointly or end-to-end (depending on the planning approach) with the VRN.

It should be noted that the state value prior actually depends on the specific goal $g_m$ of the MDP: $V(z, g_m)$ (and accordingly the VRN generates refined values $Q(z,*,g_m)$). For simplicity of notation, this goal-dependency is omitted in the following, i.e. simply V(z) (or Q(z,*)) are used in the following.

Value Refinement Network (VRN)

The value refinement according to the hierarchical VRN-based approach allows to consider the effects of the full robot state s at least locally in the plan and values.

The Value Refinement network is a module represented by neural network $y = f_\psi(\mathcal{J}) = f_\psi(\tilde{V}_z, s, (\tilde{\Phi}_z))$ with parameters ψ and input $\mathcal{J}$.

Figure 2:
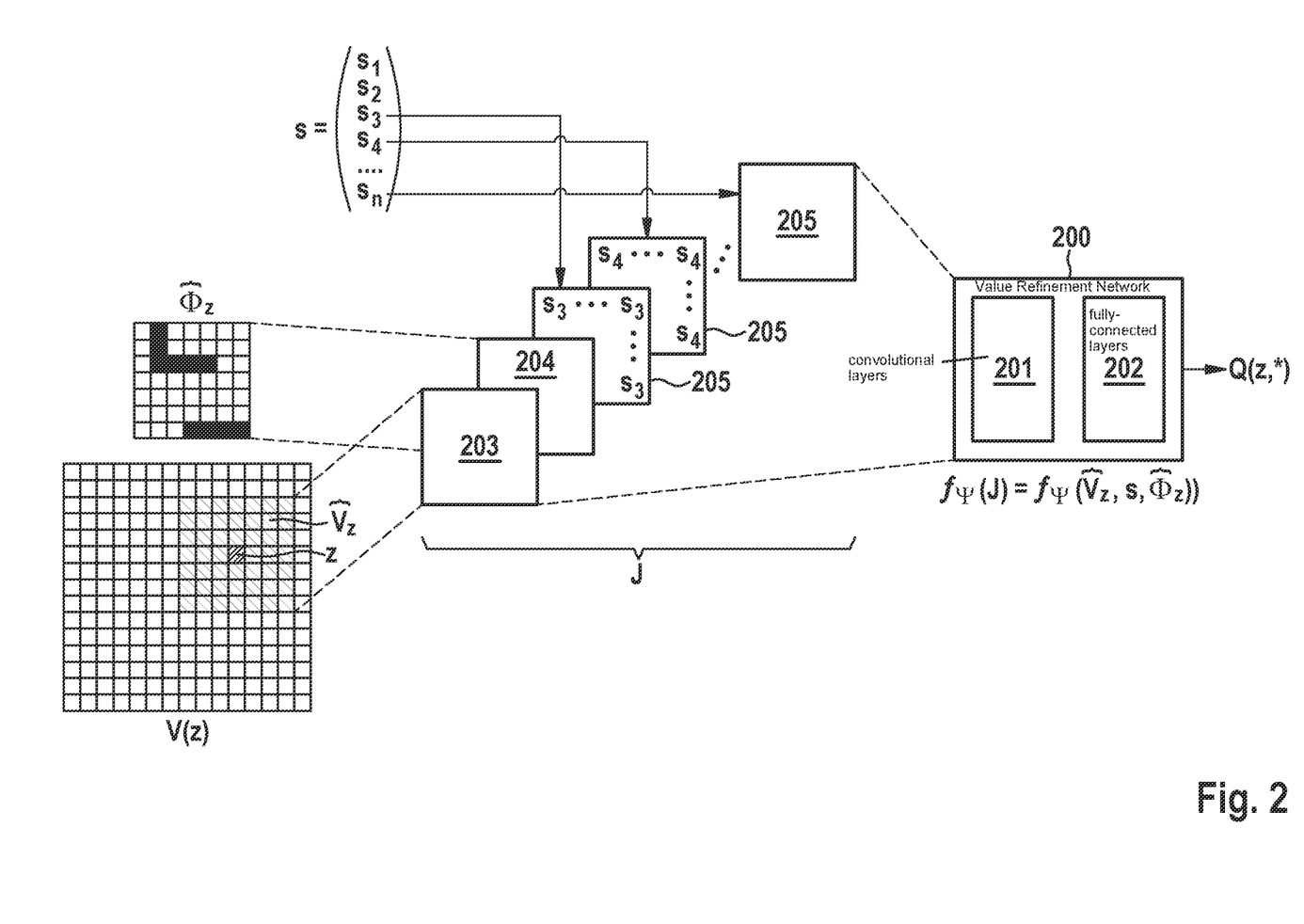
FIG. 2 shows an exemplary realization of a Value Refinement Network according to an example embodiment of the present invention.

The input $\mathcal{J}$ is composed of:

$\tilde{V}_z$, a local (k×k, in case of 2D prior) crop of the state value prior V(z), centered on the current abstract (high-level) state z the full (continuous) robot state s, potentially including local sensor measurements like e.g. the local obstacle layout optionally, a local (obstacle/layout map) crop $\tilde{\Phi}_z$, in case a static, discretized environment/workspace map Φ is given/known as prior knowledge, similar to the VI-RL approach, corresponding to the state value prior crop dimensions FIG. 2 shows an exemplary realization of a Value Refinement Network 200 and its inputs as it could be e.g. used for a vehicle navigation task according to an embodiment.

The Value Refinement Network 200 is realized as a convolutional neural network (CNN) composed of some convolutional layers 201 followed up by some fully-connected layers 202 (after flattening the feature maps) to generate the network output Q(z,*). For such an architecture, the network input $\mathcal{J}$ consists of several channels 203, 204, 205 (or input feature maps). In the example, the first input feature map is a k×k (k=7 in FIG. 2) crop $\widetilde{V}_z$ 203 of the state value prior V(z), centred on the current abstract (high-level) state z of the robot (e.g. vehicle). Assuming a discrete (x,y) map $\Phi$ of the environment, indicating static obstacles, known or given, for the example, a k×k crop $\widetilde{\Phi}_z$ 204, centered on z, forms the second input channel. Additional input channels 205 are formed by selecting components $s_i$ of the full (continuous) robot state and putting the value into every entry (i.e. matrix cell) for that additional input channel (exemplarily shown for $s_3$ and $s_4$). This means that, for example, the third channel, is a k×k matrix where all entries are equal to $s_3$.

Such state components may for example indicate the velocity of the robot/vehicle in x,y or the orientation. In case of angular values (e.g. vehicle orientation), it might be beneficial to represent this state component with individual input channels for the sine and the cosine of the angle, in order to prevent ambiguities.

The Value Refinement Network outputs refined Q-values Q(z,*). These can be seen as evaluation of actions and are used for (e.g. high-level) action selection. In case of a hierarchical controller set-up, the actions are high-level actions and reflect sub-goals $z_g$ for a low-level controller. Alternatively (in the non-hierarchical case), the actions selected based on the refined values reflect discrete control signals.

Policy using Value Refinement Network

For a high-level policy $\omega_\psi(z_g|s,z,V)$ in a hierarchical controller set-up $o=z_g$. According to the high-level policy, the (abstract) high-level state $z_g$ with the highest refined value $Q(z,z_g)$ as sub-goal (high-level action) is selected.

This can be written as (wherein the ':=' is to be read as that the high-level policy selects the result of the arg max operation).

$$\omega_\psi(o|s, z, V) := \arg\max_o Q(z, o) = \arg\max_o f_\psi\left(\widetilde{V}_z, s, (\widetilde{\Phi})_z\right)$$

For a non-hierarchical: policy $\omega_\psi(a|s,z,V)$ for discrete control action selection o=a.

This means that according to the control policy, the discrete action a with the highest refined value Q(z,a) is selected as action. In the non-hierarchical case z is a subset of the components of s.

The parameters $\psi$ of the control policy may be determined (optimized) using a double DQN with potential application of Hindsight Experience Replay (HER).

Double DQN features an "online" network and a "target" network having the same architecture. The parameters of the online network are denoted as $\psi$, whereas the target network parameters are denoted as $\psi^-$ (since they are in fact "old" online network parameters). For updating the parameters $\psi$ of the online network, value target and value prediction are:

$$Q_{target,t} = r_{t+1} + (1 - d_t)\gamma Q\left(s_{t+1}, \arg\max_a Q(s_{t+1}, a_t; \psi_t); \psi_t^-\right)$$

with d denoting the done flag, i.e. d=1 if the corresponding state was terminal and d=0 otherwise $$Q_{prediction,t} = Q(s_t, a_t; \psi_t)$$

In case of the Value Refinement Network $Q(s,a;\psi^{(-)})$ is $f_{\psi^{(-)}}(s)$ (reflecting $Q(s,*;\psi^{(-)})$ and including values for all actions a) evaluated for action a. This is denoted as $f_{\psi^{(-)}}(s)$ (a). s is $\mathcal{J}$, and a is $z_g$ (when selecting sub-goals).

Across the training, repeatedly, the MSE-loss between prediction and target is calculated, for a batch of transitions from the transition buffer, and optimized by an optimizer like e.g. Adam, in order to update the online network parameters $\psi$. After a certain amount of updates or environment steps, the target network parameters $\psi^-$ are replaced with the current online network parameters $\psi$.

Hindsight Experience Replay (HER) is a technique to generate additional, re-labelled transitions in the replay buffer with a different, actually during the episode (or rollout) reached, goal (and obtained reward accordingly), when learning goal-conditioned value functions. This way, sample efficiency, especially in sparse reward settings, is improved. In case of the VRN, the crop of the state value prior in the input $\mathcal{J}$ is substituted by a crop of a state value prior corresponding to the actually reached goal/achieved task (using $V(z,g_{HER})$), when generating HER transitions.

There are different strategies for obtaining hindsight goals $g_{HER}$: For example, the "final" strategy where the last state of the rollout/episode is used as hindsight goal $g_{HER}$ to re-label transitions. Or the "future" strategy, where a specified number of states appearing in the rollout/episode after the transition at hand are selected as hindsight goals $g_{HER}$.

Low-Level Controller in Case of Hierarchical Controller Architecture

The high-level policy gives selections of sub-goals based on the Value Refinement Network output, reflecting a sub-task to be accomplished or a target that needs to be reached by a suitable low-level controller (implementing the low-level control policy).

In principle, any type of controller that takes the sub-goal and the state, potentially including local sensor measurements, as input and generates control signals (actions) a (e.g. for actuators) is possible. This low-level controller might be a "classical" (non-learned) controller or it might be a reinforcement learning trained policy as well:

Similar to the VI-RL approach, a reinforcement learning trained sub-goal-conditioned low-level policy can be used as low-level controller. It is defined as $\pi_\theta(a|s,h(z_g,s))$ with h(.,.) being a suitable function that transforms the high-level sub-goal $z_g$ into a suitable target vector with respect to the current robot state s to pursue for the low-level controller. For example, $h(z_g,s)$ is a position offset vector indicating a relative position to which the low-level controller should move the robot.

The sub-goal-conditioned reward function for the low-level policy can in principle have an arbitrary form as long as it provides an incentive for achieving the sub-goal. For example, a sparse reward of 1 for reaching the sub-goal and 0 otherwise is possible.

The low level-reinforcement learning policy $\pi_\theta$ is trained using the "sub-episodes" that arise within the training episodes of horizon T from repeated sub-goal selection of the high-level policy. The execution of a sub-goal $z_g$ has a maximum time horizon of $T_{z_g} \ll T$.

For training a low-level RL policy, any RL algorithm of choice can be used, like e.g. Q-learning, Deep Q-Networks (DQN), Trust Region Policy Optimization (TRPO), Proximal Policy Optimization (PPO), Deep Deterministic Policy Gradient (DDPG), Twin Delayed DDPG (TD3), (Asynchronous) Advantage Actor Critic (A2C/A3C).

As a result, the return maximization in the objective is with respect to the parameters $\psi$ of the Value Refinement Network, optionally the parameters $\theta$ of an (RL-trained) low-level policy, in case of a hierarchical RL policy set-up, and optionally the prior value planner parameters $\chi$, in case it is learned:

$$\max_{\theta,\psi} \mathbb{E}_{m\sim\mathcal{M}, s_{0,m}\sim\mathcal{S}_{0,m}, g_m\sim\mathcal{S}_{g,m}, \mathcal{P}_m, \pi_\theta, \omega_\psi} \left[ \sum_{t=0}^{T} \gamma^t r(s_t, g_m) \right]$$

(hierarchical RL policy, value prior given)

$$\max_{\theta,\psi,\chi} \mathbb{E}_{m\sim\mathcal{M}, s_{0,m}\sim\mathcal{S}_{0,m}, g_m\sim\mathcal{S}_{g,m}, \mathcal{P}_m, \pi_\theta, \omega_\psi, \chi} \left[ \sum_{t=0}^{T} \gamma^t r(s_t, g_m) \right]$$

(hierarchical RL policy, prior planner learned)

$$\max_{\psi} \mathbb{E}_{m\sim\mathcal{M}, s_{0,m}\sim\mathcal{S}_{0,m}, g_m\sim\mathcal{S}_{g,m}, \mathcal{P}_m, \omega_\psi} \left[ \sum_{t=0}^{T} \gamma^t r(s_t, g_m) \right]$$

(no low—level RL policy, value prior given)

$$\max_{\psi,\chi} \mathbb{E}_{m\sim\mathcal{M}, s_{0,m}\sim\mathcal{S}_{0,m}, g_m\sim\mathcal{S}_{g,m}, \mathcal{P}_m, \omega_\psi, \chi} \left[ \sum_{t=0}^{T} \gamma^t r(s_t, g_m) \right]$$

(no low—level RL policy, prior planner learned)

Deployment of Value Refinement Network

To deploy the Value Refinement Network the following is performed:

A. Get the known state value prior V(z) or obtain it making e.g. use of a prior, static environment/workspace map $\Phi$ and the goal state $g_m$ and apply a suitable (value-based) planning approach.

B. Obtain a recent observation of the (continuous) robot state, which is provided together with the state value prior and optionally the environment/workspace map to the VRN.

C. Using this provided information, generate the network input $\mathcal{J}$ (see FIG. 2).

D. Compute a network forward pass of the VRN (with parameters $\psi$) using the network input $\mathcal{J}$.

E. The VRN outputs refined values Q(z,*) to be used for discrete action selection or for sub-goal selection.

As mentioned above, the VRN may be trained using double DQN with optional application of HER. The value target and value prediction for batched MSE-loss minimization between prediction and target based on buffered experience (transitions) are:

$$Q_{target,t} = r_{t+1} + (1-d_t)\gamma f_{\psi_t^-}(\mathcal{J}_{t+1}) \left( \operatorname*{argmax}_o f_{\psi_t}(\mathcal{J}_{t+1}) \right)$$

with $d_t$ denoting the done flag $$Q_{prediction,t} = f_{\psi_t}(\mathcal{J}_t)(o_t)$$

with o either representing a discrete action a or a sub-goal $z_g$.

The VRN can be trained and deployed as part of a hierarchical controller or a non-hierarchical controller, in order to control a robot device (e.g. a computer-controlled machine, robot, vehicle, etc.).

In the following, examples for the components, training, and deployment routines for the control loop for a hierarchical and a non-hierarchical set-up are given. The following operations may for example all be carried out by controller 105 but training may also be performed by another device (e.g. using simulation of the robot device 100 and its environment 101) and the result of the training may be stored in the controller 105 for deployment.

Hierarchical Controller

This application variant is especially suited for continuous control tasks.

The overall controller architecture includes the following components:

State Value Prior: Either provided as prior knowledge/information or obtained from the discretized environment information (e.g. discrete map) and goal state using a value iteration style planning module (potentially includes a neural network component in this case).

Value Refinement Network (VRN): takes a local crop of the state value prior, the (continuous) robot device state, and optionally prior information about the environment/workspace (e.g. static maps) to form the network input and outputs refined Q-values for the current robot device state. See FIG. 2 for an exemplary, effective realization.

High-Level Controller: Selects sub-goals (high-level actions) for the low-level controller according to the highest refined (Q-)value of the VRN output. Maintains a high-level transition buffer.

Low-level controller: controller that interacts with the (simulation) environment trying to successfully achieve the selected sub-goals. For example, similar to the VI-RL approach, a parametric (neural network) policy, trained by the reinforcement learning algorithm of choice; rewarded for achieving the sub-goals. Maintains a low-level transition buffer. Training and deployment are shown denoted for an RL-trained policy as low-level controller below. In case of a "classical", non-learned controller, III. of the training (updating low-level policy parameters) is not executed. The low-level controller is then assumed to be designed before training/deployment.

The hierarchical policy is trained for several training iterations until a maximum number of training iterations is reached or it meets a pre-defined quality criterion with respect to the objective function. In every iteration:

I. Data is gathered by interacting with the (simulation) environment(s) for a number of episodes. In every episode:

a. The specific (simulation) environment is provided/sampled as well as the start state and the desired goal state of the robot device.

b. The state value prior V(z) for this specific environment-start-goal setting is either given/known or determined by an appropriate planning module (e.g. given a discretized environment map and the desired goal state as input).

c. Starting in the start state and being provided the initial sub-goal from the high-level policy, based on the (Q-value) output of the Value Refinement Network, which is provided the state value prior, the (start) state observation, and optionally prior environment information (e.g. map), the robot device interacts with the (simulation) environment until the goal state is reached or the maximum interaction step number (time horizon) T is reached. In every interaction step:
  i. The robot device receives some state observation (potentially pre-processed sensory information).
  ii. If new sub-goal selection was triggered in vii., the high-level policy provides a new sub-goal based on the newly computed (Q-value) output of the Value Refinement Network, which is provided the state value prior, the current state observation, and optionally prior environment information (e.g. map). The high-level transition<(previous) VRN input $\mathcal{J}$, (previous) sub-goal $z_g$, new VRN input $\mathcal{J}$, environmental reward (accumulated and discounted across the taken low-level steps), goal done flag> is stored in a high-level transition buffer. In case the state value prior generation features a neural network component, the previous and new inputs to that are stored in the buffer as well.
  iii. Based on the state observation and the current sub-goal, the low-level (RL) policy provides a control signal (action).
  iv. The control signal (action) is applied to the actuators of the robot device.
  v. As a result, the robot device/environment is in a new state and the reward for this transition is provided by the (sub-goal-conditioned, intrinsic) low-level reward function.
  vi. The low-level transition <state, action, new state, (low-level, intrinsic) reward, sub-goal done flag> is stored in a low-level transition buffer.
  vii. If either the sub-goal is reached or the maximum sub-goal time horizon $T_{z_g}$ is reached, the selection of a new sub-goal in ii. is triggered.

If the maximum interaction step number (time horizon) T is reached, store the last high-level transition similar to vi. If HER is used, generate the high-level hindsight transitions according to the chosen strategy based on the high-level and low-level transitions, the state value prior(s), as well as the optional prior environment information (e.g. map) of the current episode, and store these hindsight transitions in the high-level transition buffer as well.

II. The parameters of the Value Refinement Network are updated using the double DQN update routine by performing several update steps by repeatedly sampling a batch from the high-level transition buffer, calculating the loss according to double DQN, and adapting the network parameters using a gradient-based optimizer like Adam. In case the state value prior generation involves a planning module with a parametric (neural network) component, the parameters of this component are jointly updated as well (by also backpropagating through the component).

III. After a certain amount of episodes, the low-level policy is updated using the data in the low-level transition buffer using the reinforcement learning algorithm of choice.

Once the hierarchical policy is trained, the following is carried out during deployment:
I. The specific (simulation) environment is provided/sampled as well as the start state and the desired goal state of the robot device.

II. The state value prior V(z) for this specific environment-start-goal setting is either given/known or determined by an appropriate planning module (e.g. given a discretized environment map and the desired goal state as input).

III. Starting in the start state and being provided the initial sub-goal from the high-level policy, based on the (Q-value) output of the Value Refinement Network, which is provided the state value prior, the (start) state observation, and optionally prior environment information (e.g. map), the robot device interacts with the (simulation) environment until the goal state is reached or the maximum interaction step number (time horizon) T is reached. In every interaction step:
  a. The robot device receives some state observation (potentially pre-processed sensory information).
  b. If new sub-goal selection was triggered in f., the high-level policy provides a new sub-goal based on the newly computed (Q-value) output of the Value Refinement Network, which is provided the state value prior, the current state observation, and optionally prior environment information (e.g. map).
  c. Based on the state observation and the current sub-goal, the low-level (RL) policy calculates a control signal (action).
  d. The control signal (action) is applied to the actuators of the robot device.
  e. As a result, the robot device/environment is in a new state.
  f. If either the sub-goal is reached or the maximum sub-goal time horizon $T_{z_g}$ is reached, the selection of a new sub-goal in b. is triggered.

Non-Hierarchical Controller (Discrete State Signals)

This embodiment is for example relevant for discrete state and action space problems, where the abstract planning representation might be obtained by simply selecting some of the discrete state components.

The overall controller architecture features the following components:
  State Value Prior: Either provided as prior knowledge/information or obtained from the discretized environment information (e.g. discrete map) and goal state using a value iteration style planning module (potentially includes a neural network component in this case).
  Value Refinement Network (VRN): Takes a local crop of the state value prior, the robot device state, and optionally prior information about the environment/workspace (e.g. static maps) to form the network input and outputs refined Q-values for the current robot device state. See FIG. 2 for an exemplary, effective realization.
  Policy: Selects discrete actions a according to the highest refined (Q-)value of the VRN output. Maintains a transition buffer.

The policy is trained for several training iterations until a maximum number of training iterations is reached or it meets a pre-defined quality criterion with respect to the objective function. In every iteration:
  I. Data is gathered by interacting with the (simulation) environment(s) for a number of episodes. In every episode:
    a. The specific (simulation) environment is provided/sampled as well as the start state and the desired goal state of the robot device.
    b. The state value prior V(z) for this specific environment-start-goal setting is either given/known or determined by an appropriate planning module (e.g. given a discretized environment map and the desired goal state as input).
c. Starting in the start state, the robot device interacts with the (simulation) environment until the goal state is reached or the maximum interaction step number (time horizon) T is reached. In every interaction step:
   i. The robot device receives some state observation (potentially pre-processed sensory information).
   ii. Store the transition <(previous) VRN input $\mathfrak{z}$, (previous) action a, new VRN input $\mathfrak{z}$, (environmental) reward, goal done flag> in a transition buffer. In case the state value prior generation features a neural network component, the previous and new inputs to that are stored in the buffer as well.
   iii. The policy selects a new action (control signal) based on the newly computed (Q-value) output of the Value Refinement Network, which is provided the state value prior, the current state observation, and optionally prior environment information (e.g. map).
   iv. The control signal (action) is applied to the actuators of the robot device.
   v. As a result, the robot device/environment is in a new state and the reward for this transition is provided by the (environmental) reward function.
   If the maximum interaction step number (time horizon) T is reached, store the last transition similar to vi. If HER is used, generate the hindsight transitions according to the chosen strategy based on the transitions, the state value prior(s), as well as the optional prior environment information (e.g. map) of the current episode, and store these hindsight transitions in the transition buffer as well.
II. The parameters of the Value Refinement Network are updated using the double DQN update routine by performing several update steps by repeatedly sampling a batch from the high-level transition buffer, calculating the loss according to double DQN, and adapting the network parameters using a gradient-based optimizer like Adam. In case the state value prior generation involves a planning module with a parametric (neural network) component, the parameters of this component are jointly updated as well (by also back-propagating through the component).
III. After a certain amount of episodes, the low-level policy is updated using the data in the low-level transition buffer using the reinforcement learning algorithm of choice.

Once the policy is trained, the following is carried out during deployment:
I. The specific (simulation) environment is provided/sampled as well as the start state and the desired goal state of the robot device.
II. The state value prior V(z) for this specific environment-start-goal setting is either given/known or determined by an appropriate planning module (e.g. given a discretized environment map and the desired goal state as input).
III. Starting in the start state, the robot device interacts with the (simulation) environment until the goal state is reached or the maximum interaction step number (time horizon) T is reached. In every interaction step:
a. The robot device receives some state observation (potentially pre-processed sensory information).
b. The policy selects a new action (control signal) based on the newly computed (Q-value) output of the Value Refinement Network, which is provided the state value prior, the current state observation, and optionally prior environment information (e.g. map).
c. The control signal (action) is applied to the actuators of the robot device.
d. As a result, the robot device/environment is in a new state.

It should be noted that, depending on the use case, the training is not necessarily performed by a controller in the robot itself but may also be performed by an external device, e.g. using simulation (this applies to both the hierarchical as well as the non-hierarchical case).

Figure 3:
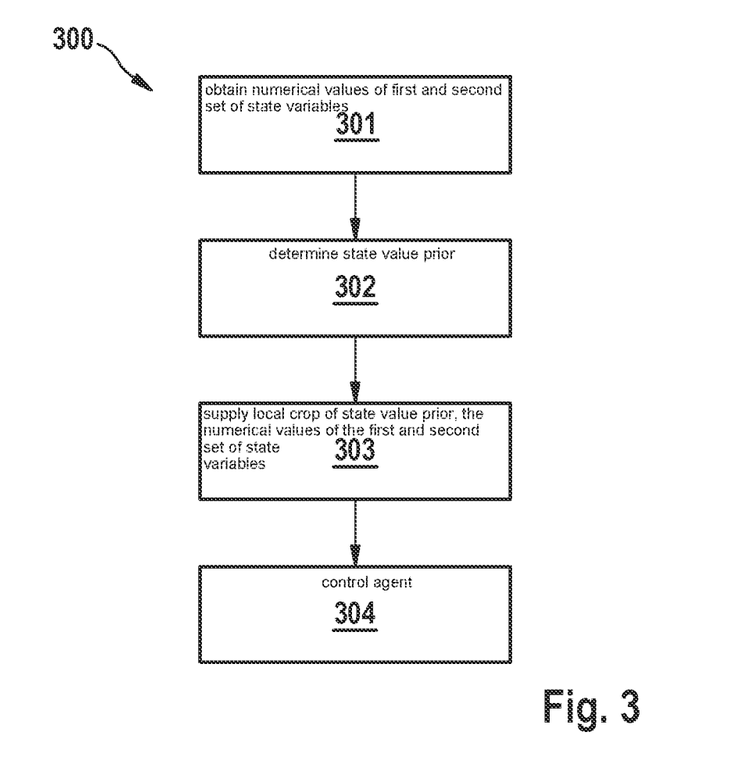
FIG. 3 shows a flow diagram illustrating a method for controlling an agent according to an example embodiment of the present invention.

In summary, according to various embodiments, a method is provided as illustrated in FIG. 3.

FIG. 3 shows a flow diagram 300 illustrating a method for controlling an agent according to an embodiment.

In 301, numerical values of a first set of state variables and a second set of state variables are obtained, wherein the numerical values of the first set of state variables together with the numerical values of the second set of variables represent a current full state of the agent and the numerical values of the first set of state variables represent a current partial state of the robot.

In 302, a state value prior is determined including, for potential subsequent partial states following the current partial state, an evaluation of the subsequent partial states in terms of achieving a goal to be attained by the agent.

In 303, a local crop of the state value prior and the numerical values of the second set of state variables representing, together with the numerical values of the first set of state variables, the current full state are supplied in an input to a neural network configured to output an evaluation of control actions.

In 304, the agent is controlled in accordance with control signals derived from an evaluation of control actions output by the neural network in response to the input.

According to various embodiments, in other words, a state value prior is used which gives values for coarse-scale states (i.e. partial states). A value refinement network uses the prior as well as further information about the current state (and thus the full state information, not only the coarse-scale state information) and generates from this input evaluations of control actions (e.g. Q values). The control actions may relate to coarse scale, e.g. indicate the coarse-scale state to which to change and may thus indicate a sub-goal for a fine-scale control policy. The agent is controlled using the evaluations of control actions (e.g. in accordance with the control action with the highest evaluation value, e.g. Q value). If the control indications indicate sub-goals for a fine-scale control policy, the fine-scale control policy controls the agent to attain the sub-goal.

Various embodiments may receive and use image data (i.e. digital images) from various visual sensors (cameras) such as video, radar, LiDAR, ultrasonic, thermal imaging, motion, sonar etc., for example to obtain the numerical values of the first and second state variables.

For example, as part of the overall control loop (sensor-→controller→actuator→effect (in environment)→sensor), the approach may directly or indirectly receive sensor signals from potentially any type of sensor. Furthermore, the Value Refinement Network may use sensory information to refine the state value prior.

The approach of FIG. 3 can be used to compute a control signal for controlling any agent, i.e. a software agent or a physical system, like e.g. a computer-controlled machine, like a robot, a vehicle, a domestic appliance, a power tool, a manufacturing machine, a personal assistant or an access control system. According to various embodiments, a policy for controlling the physical system may be learnt and then the physical system may be operated accordingly.

For example, in case of vehicles (e.g. cars) or mobile robots, the approach of FIG. 3 (e.g. the VRN-based approach described in detail above) can be applied in the following way: The floor plan or road topology relevant for the navigation task can be represented by a 2D grid discretization of the x-, and y-coordinate. Shortest path planning can be used to obtain a 2D state value prior in this 2D grid. This 2D prior already provides guidance to the vehicle or robot by roughly indicating the path lengths to the goal. However, for navigating a realistic vehicle or robot this map will not be sufficient. For example, dependent on the robot's orientation, not all neighbouring grid cells for a given x,y position are reachable due to constraints in the steering mechanism. Furthermore, in case of a mobile robot navigating indoors, some obstacles, like a chair or table, might not have been part of the floor plan or have changed their position meanwhile so that the robot needs to account for them locally in the plan. The Value Refinement Network takes a local crop of the state value prior, centred on the grid cell the current continuous robot position falls in, the full continuous robot state, including e.g. the velocity and orientation of the robot, and potentially some local sensor information (e.g. about nearby obstacles) or local crop of a known, static environment map as input. The Value Refinement Network outputs refined values for selecting a neighbouring cell as a sub-goal for a low-level tracking controller, which is potentially a reinforcement learning trained policy.

In case of a manipulation robot, the approach of FIG. 3 can be applied similarly by additionally considering the z-coordinate of the workspace in the abstract (high-level) representation.

Finally, the approach of FIG. 3 can also be applied more generally on symbolic task abstractions: For example, a cooking-robot (intelligent/advanced food processor) is given a recipe for preparing a meal. A state value prior is obtained from the most efficient plan to prepare and mix the different ingredients by counting the steps to task completion of every stage. The Value Refinement Network can be utilized to refine this state value prior accordingly, if the robot detects by means of sensor readings that certain ingredients or instruments are currently in use by another cook in the same kitchen. In this case, the robot would decide to continue with another step first, based on the refined values.

According to one embodiment, the method is computer-implemented. Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for controlling an agent, the method comprising the following steps:
    obtaining numerical values of a first set of state variables and a second set of state variables,
    wherein:
        i) the first set of state variables comprises a set of state variables that represent the agent's state and that are selected depending on relevancy to a goal set to be achieved by the agent;
        ii) the second set of state variables comprises a set of state variables that represent sensory information of the agent's state and that are selected depending on relevancy to the goal;
        iii) the second set of state variables have a higher resolution than the first set of state variables;
        iii) the numerical values of the first set of state variables together with the numerical values of the second set of variables represent a current full state of the agent; and
        iv) the numerical values of the first set of state variables represent a current partial state of the agent;
    determining a state value prior, wherein the state value prior includes, for each of a plurality of potential partial states into which the agent can be transitioned after being in the current partial state, a respective prior estimation of a value or cost of being in the respective potential state for the agent to achieve the goal, the prior estimations being generated based on a model of an environment;
    supplying an input to a neural network, wherein the input includes:
        a local crop of the state value prior, the local crop being a sub-section of the state value prior centered at the current partial state of the agent and having a pre-defined extent from the current partial state;
        the numerical values of the second set of state variables; and
        the numerical values of the first set of state variables;
    outputting, by the neural network and based on the supplied input, a respective value or cost for each of a plurality of control actions to perform while the agent is at the current state of the agent;
    selecting one or more of the control actions based on the values or costs output by the neural network; and
    controlling the agent in accordance with control signals for executing the selected one or more of the control actions.

2. The method of claim 1, wherein controlling the agent comprises determining a sub-goal based on the output of the neural network, determining control signals for attaining the sub-goal and controlling the agent in accordance with the control signals.

3. The method of claim 2, wherein the sub-goal specifies a target partial state.

4. The method of claim 3, further comprising:
    determining the sub-goal by a planning policy operating on partial states represented by the first set of state variables; and
    determining the control signals for attaining the sub-goal using a control policy operating on full states represented by the first set of state variables and the second set of state variables.

5. The method of claim 4, further comprising training the control policy by reinforcement learning.

6. The method of claim 1, further comprising:
    determining prior environment information, wherein the input further includes the prior environment information.

7. The method of claim 1, wherein the input further includes the values of at least some of the first set of state variables.

8. The method of claim 1, wherein the neural network is a convolutional neural network and the method further comprises inputting the local crop of the state value prior as an input feature map and the numerical value of each state variable of the second set of state variables as values of a respective additional input feature map for each state variable of the second set of state variables to the neural network.

9. The method of claim 1, further comprising training the neural network to output evaluations of control actions in response to a local crop of a state value prior input and a state variable input.

10. The method of claim 9, comprising training the neural network using a double deep Q network algorithm.

11. The method of claim 1, wherein the resolution of the second set of state variables is higher spatially than the resolution of the first set of state variables.

12. A controller configured to control an agent, the controller configured to:
  obtain numerical values of a first set of state variables and a second set of state variables,
  wherein:
    i) the first set of state variables comprises a set of state variables that represent the agent's state and that are selected depending on relevancy to a goal set to be achieved by the agent;
    ii) the second set of state variables comprises a set of state variables that represent sensory information of the agent's state and that are selected depending on relevancy to the goal;
    iii) the second set of state variables have a higher resolution than the first set of state variables;
    iii) the numerical values of the first set of state variables together with the numerical values of the second set of variables represent a current full state of the agent; and
    iv) the numerical values of the first set of state variables represent a current partial state of the agent;
  determine a state value prior, wherein the state value prior includes, for each of a plurality of potential partial states into which the agent can be transitioned after being in the current partial state, a respective prior estimation of a value or cost of being in the respective potential state for the agent to achieve the goal, the prior estimations being generated based on a model of an environment;
  supply an input to a neural network, wherein the input includes:
    a local crop of the state value prior, the local crop being a sub-section of the state value prior centered at the current partial state of the agent and having a predefined extent from the current partial state;
    the numerical values of the second set of state variables; and
    the numerical values of the first set of state variables;
  output, by the neural network and based on the supplied input, a respective value or cost for each of a plurality of control actions to perform while the agent is at the current state of the agent;
  select one or more of the control actions based on the values or costs output by the neural network; and
  control the agent in accordance with control signals for executing the selected one or more of the control actions.

13. A non-transitory computer-readable medium on which is stored a computer program for controlling an agent, the computer program, when executed by a computer, causing the computer to perform the following steps:
  obtaining numerical values of a first set of state variables and a second set of state variables,
  wherein:
    i) the first set of state variables comprises a set of state variables that represent the agent's state and that are selected depending on relevancy to a goal set to be achieved by the agent;
    ii) the second set of state variables comprises a set of state variables that represent sensory information of the agent's state and that are selected depending on relevancy to the goal;
    iii) the second set of state variables have a higher resolution than the first set of state variables;
    iii) the numerical values of the first set of state variables together with the numerical values of the second set of variables represent a current full state of the agent; and
    iv) the numerical values of the first set of state variables represent a current partial state of the agent;
  determining a state value prior, wherein the state value prior includes, for each of a plurality of potential partial states into which the agent can be transitioned after being in the current partial state, a respective prior estimation of a value or cost of being in the respective potential state for the agent to achieve the goal, the prior estimations being generated based on a model of an environment;
  supplying an input to a neural network, wherein the input includes:
    a local crop of the state value prior, the local crop being a sub-section of the state value prior centered at the current partial state of the agent and having a predefined extent from the current partial state;
    the numerical values of the second set of state variables; and
    the numerical values of the first set of state variables;
  outputting, by the neural network and based on the supplied input, a respective value or cost for each of a plurality of control actions to perform while the agent is at the current state of the agent;
  selecting one or more of the control actions based on the values or costs output by the neural network; and
  controlling the agent in accordance with control signals for executing the selected one or more of the control actions.

* * * * *